(12) United States Patent
Sutton et al.

(10) Patent No.: US 9,534,896 B2
(45) Date of Patent: Jan. 3, 2017

(54) OSCILLATING VOLTAGE OF SENSE ELECTRODES IN A MEMS TUNING FORK GYROSCOPE

(71) Applicant: Honeywell International Inc., Morristown, NJ (US)

(72) Inventors: Michael S. Sutton, Wellington, CO (US); Mark W. Weber, Zimmerman, MN (US)

(73) Assignee: Honeywell International Inc., Morris Plains, NJ (US)

( * ) Notice: Subject to any disclaimer, the term of this patent is extended or adjusted under 35 U.S.C. 154(b) by 739 days.

(21) Appl. No.: 13/851,448

(22) Filed: Mar. 27, 2013

(65) Prior Publication Data

US 2015/0253138 A1    Sep. 10, 2015

(51) Int. Cl.
G01C 19/5621    (2012.01)
G01C 19/5726    (2012.01)
G01C 19/5614    (2012.01)

(52) U.S. Cl.
CPC ....... *G01C 19/5621* (2013.01); *G01C 19/5614* (2013.01); *G01C 19/5726* (2013.01)

(58) Field of Classification Search
CPC .................................. G01P 9/04; G01C 19/00
USPC ............. 73/504.12, 504.16, 504.14; 324/661
See application file for complete search history.

(56) References Cited

U.S. PATENT DOCUMENTS

| | | | |
|---|---|---|---|
| 5,481,914 A | 1/1996 | Ward | |
| 6,715,353 B2 | 4/2004 | Johnson | |
| 6,837,108 B2 | 1/2005 | Platt | |
| 6,978,673 B2 | 12/2005 | Johnson et al. | |
| 7,213,458 B2 * | 5/2007 | Weber et al. | ............. 73/504.12 |
| 7,426,861 B2 | 9/2008 | Weinberg et al. | |

(Continued)

FOREIGN PATENT DOCUMENTS

| | | |
|---|---|---|
| EP | 1873489 | 1/2008 |
| EP | 2108964 | 10/2009 |
| WO | 2012124366 | 9/2012 |

OTHER PUBLICATIONS

European Patent Office, "European Search Report for Application Serial No. 14160702.8", "from Foreign Counterpart to U.S. Appl. No. 13/851,448", Oct. 20, 2015, pp. 1-3, Published in: EP.

(Continued)

*Primary Examiner* — Michael A Lyons
*Assistant Examiner* — Suman K Nath
(74) *Attorney, Agent, or Firm* — Fogg & Powers LLC

(57) ABSTRACT

Embodiments of the subject application provide a method for operating a micro-electro-mechanical system (MEMS) tuning fork gyroscope. The method includes oscillating a voltage on a first sense electrode out-of-plane from and proximate a first side of a first proof mass between a first voltage and a second voltage at a first frequency. The method also includes oscillating a voltage on a second sense electrode out-of-plane from and proximate a second side of the first proof mass between the first voltage and the second voltage at the first frequency and 180 degrees out-of-phase with the voltage on the first sense electrode. The method also includes generating a rate signal corresponding to a rotation rate of the first proof mass by first demodulating an out-of-plane signal from the first proof mass at the first frequency and second demodulating the out-of-plane signal in phase with in-plane motion of the first proof mass.

20 Claims, 5 Drawing Sheets

(56) References Cited

U.S. PATENT DOCUMENTS

| | | | |
|---|---|---|---|
| 7,444,868 B2* | 11/2008 | Johnson | G01C 19/5719 73/504.12 |
| 7,444,869 B2* | 11/2008 | Johnson et al. | 73/504.12 |
| 7,552,637 B2 | 6/2009 | Werking | |
| 2003/0200804 A1* | 10/2003 | Johnson | G01C 19/56 73/504.12 |
| 2009/0255336 A1* | 10/2009 | Horning | G01C 19/5719 73/504.12 |
| 2009/0320592 A1* | 12/2009 | Glenn | B81B 3/0051 73/504.12 |
| 2013/0346015 A1* | 12/2013 | Yamanaka et al. | 702/141 |

OTHER PUBLICATIONS

European Patent Office, "Office Action from EP Application No. 14160702.8 mailed Jun. 22, 2015", "from Foreign Counterpart of U.S. Appl. No. 13/851,448", Jun. 22, 2015, pp. 1-6, Published in: EP.

* cited by examiner

OSCILLATING VOLTAGE OF SENSE ELECTRODES IN A MEMS TUNING FORK GYROSCOPE

BACKGROUND

A micro-electro-mechanical system (MEMS) tuning fork gyroscope can have bias mechanisms due to interaction between the proof masses and the sense electrodes. One form of bias is caused by sense bias asymmetry, which is an offset in sense bias voltage due to material properties. This asymmetry can cause a displacement of the two proof masses relative to each other which, in turn, causes drive comb disengagement, lift to drive, and finally bias. Another form of bias is charging of exposed glass which causes time varying bias.

SUMMARY

Embodiments of the subject application provide a method for operating a micro-electro-mechanical system (MEMS) tuning fork gyroscope. The method includes oscillating a voltage on a first sense electrode out-of-plane from and proximate a first side of a first proof mass between a first voltage and a second voltage at a first frequency. The method also includes oscillating a voltage on a second sense electrode out-of-plane from and proximate a second side of the first proof mass between the first voltage and the second voltage at the first frequency and 180 degrees out-of-phase with the voltage on the first sense electrode. The method also includes generating a rate signal corresponding to a rotation rate of the first proof mass by first demodulating an out-of-plane signal from the first proof mass at the first frequency and second demodulating the out-of-plane signal in phase with in-plane motion of the first proof mass.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

The embodiments described below relate to methods and systems for oscillating the voltage on the sense electrodes (for example, sense plates) of a MEMS tuning fork gyroscope in order to reduce bias caused by the voltage applied thereto. A quad cancelling signal based on the oscillating voltage can also be applied to an in-plane electrode(s) in order to affect a proper motor bias on the proof masses.

Figure 1A:
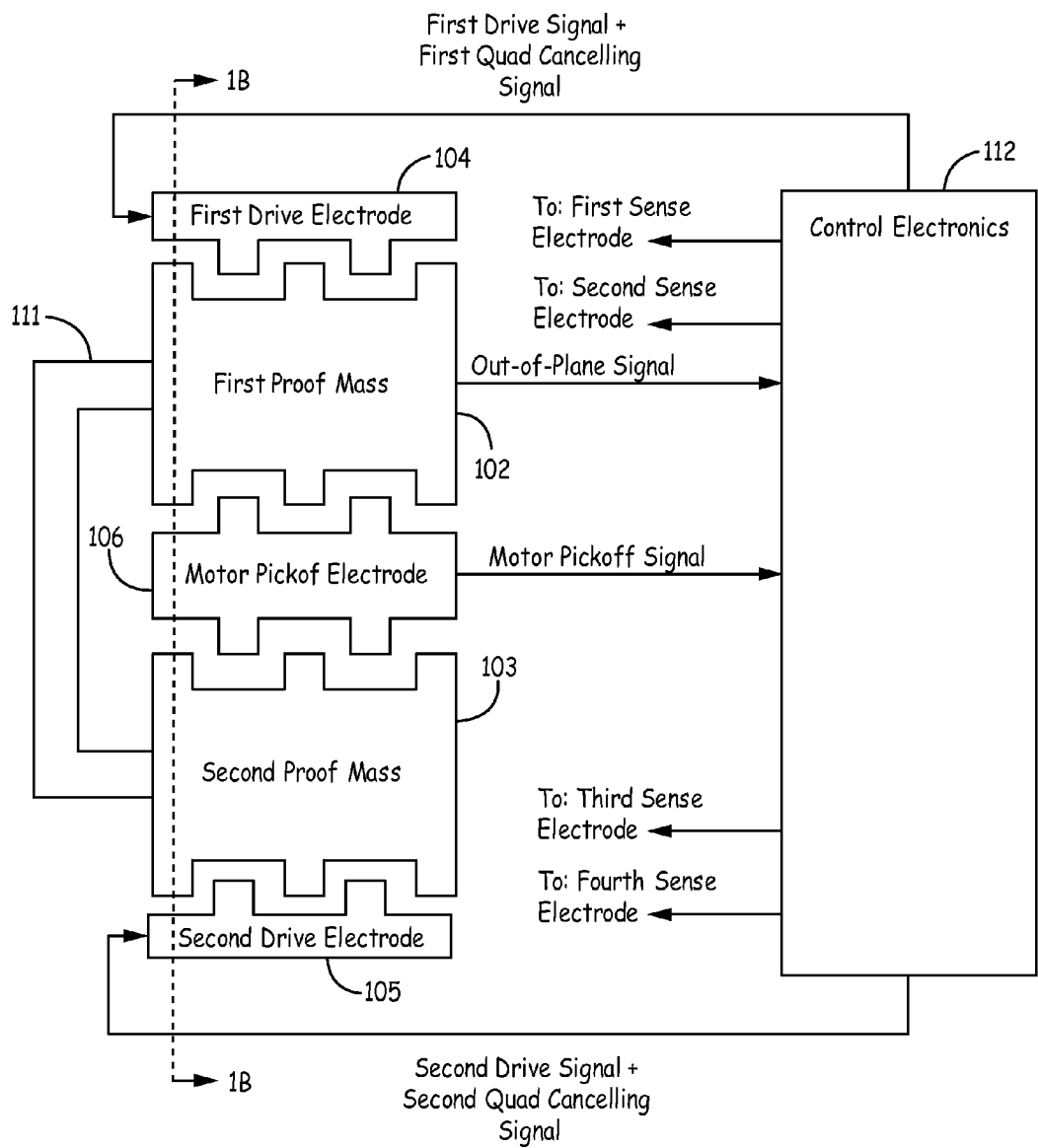
FIG. 1A is a plan view of an example of a MEMS tuning fork gyroscope.

FIG. 1A is a plan view of a micro-electro-mechanical system (MEMS) tuning fork gyroscope 100 comprising a pair of proof masses 102, 103, various electrodes 104-110, and control electronics 112. Each proof mass 102, 103 is a planar member defining two major surfaces 114-117 on reverse sides of their respective proof masses 102, 103 and having two combs on opposite edges thereof. A first of the combs of each proof mass 102, 103 is interleaved with a comb of a respective in-plane drive electrode 104, 105. A second of the combs of each proof mass 102, 103 is interleaved with a comb of an in-plane motor pickoff electrode 106.

Figure 1B:
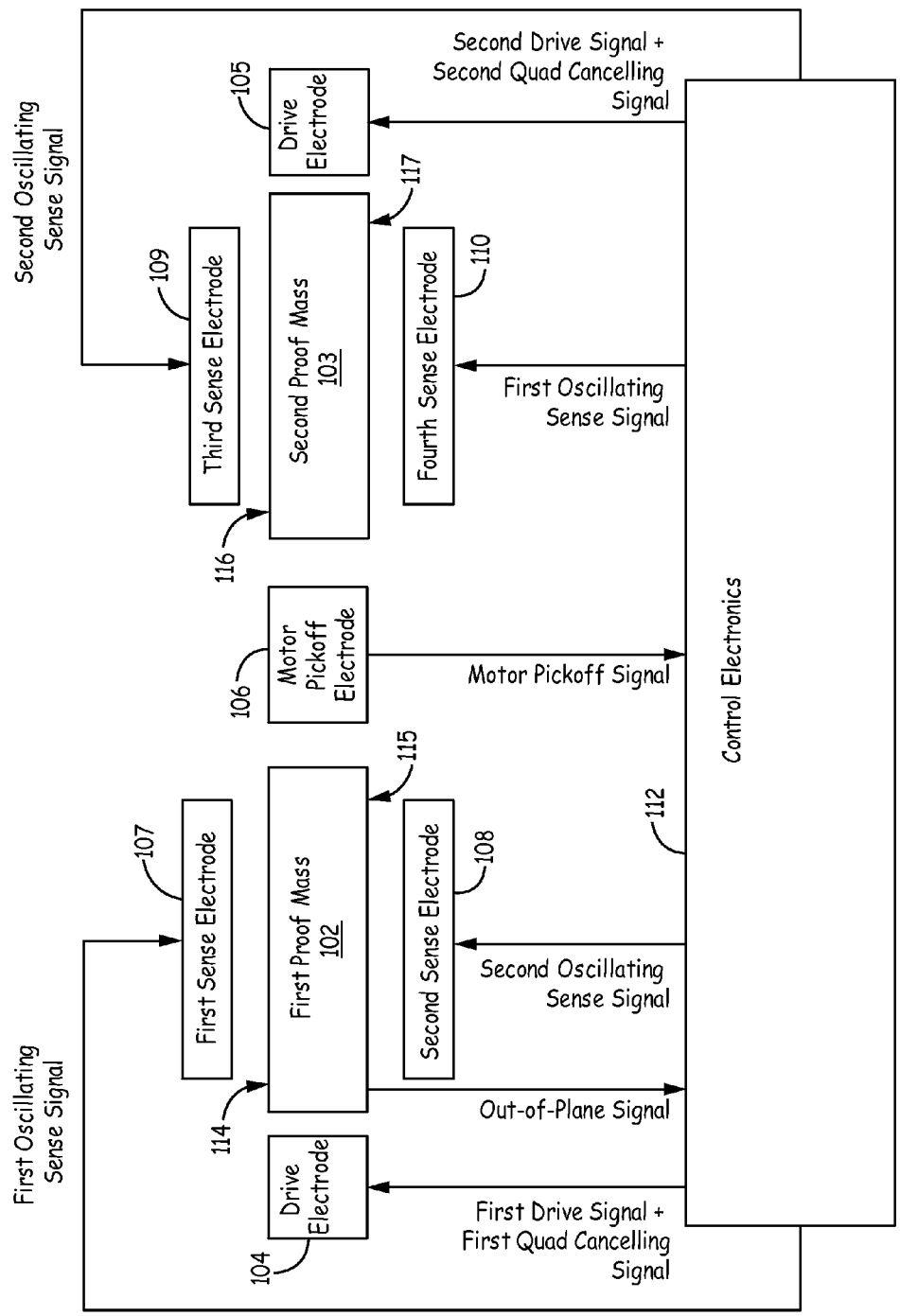
FIG. 1B is a cross-sectional view of an example of proof masses and associated electrodes from the gyroscope of FIG. 1A.

FIG. 1B is a cross-sectional view of the proof masses 102, 103 and electrodes 104-110. As shown, a pair of upper sense electrodes 107, 109 are disposed out-of-plane from the proof masses 102, 103 and each upper sense electrode 107, 109 is proximate a first surface 114, 115 of a respective proof mass 102, 103. Likewise, a pair of lower sense electrodes 108, 110 are disposed out-of-plane from the proof masses 102, 103 and each lower sense electrode 108, 110 is proximate a second surface 116, 117 of a respective proof mass 102, 103. Each proof mass 102, 103 is suspended by support flexures permitting movement of the proof masses 102, 103 relative to the in-plane motor pickoff electrode 106 and the out-of-plane sense electrodes 107-110. In the example shown in FIG. 1A, the two proof masses 102, 103 are mechanically and electrically connected via one or more flexures 111. In other examples however, the two proof masses 102, 103 can have a configuration where they are not mechanically connected via one or more flexures, and, as such, can be electrically isolated from each other.

Figure 2:
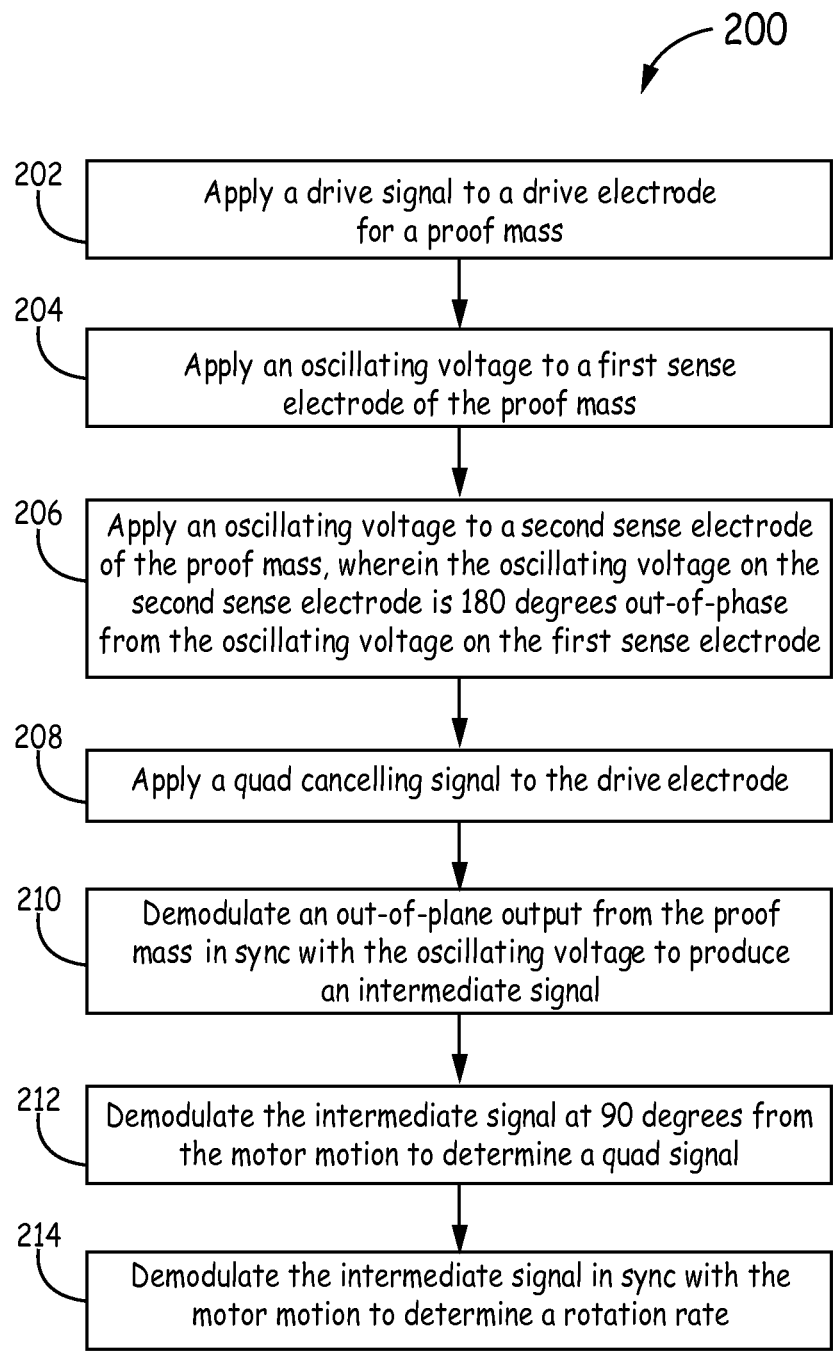
FIG. 2 is a flow chart illustrating an example method of operation of the MEMS tuning fork gyroscope of FIGS. 1A and 1B.
Figure 3:
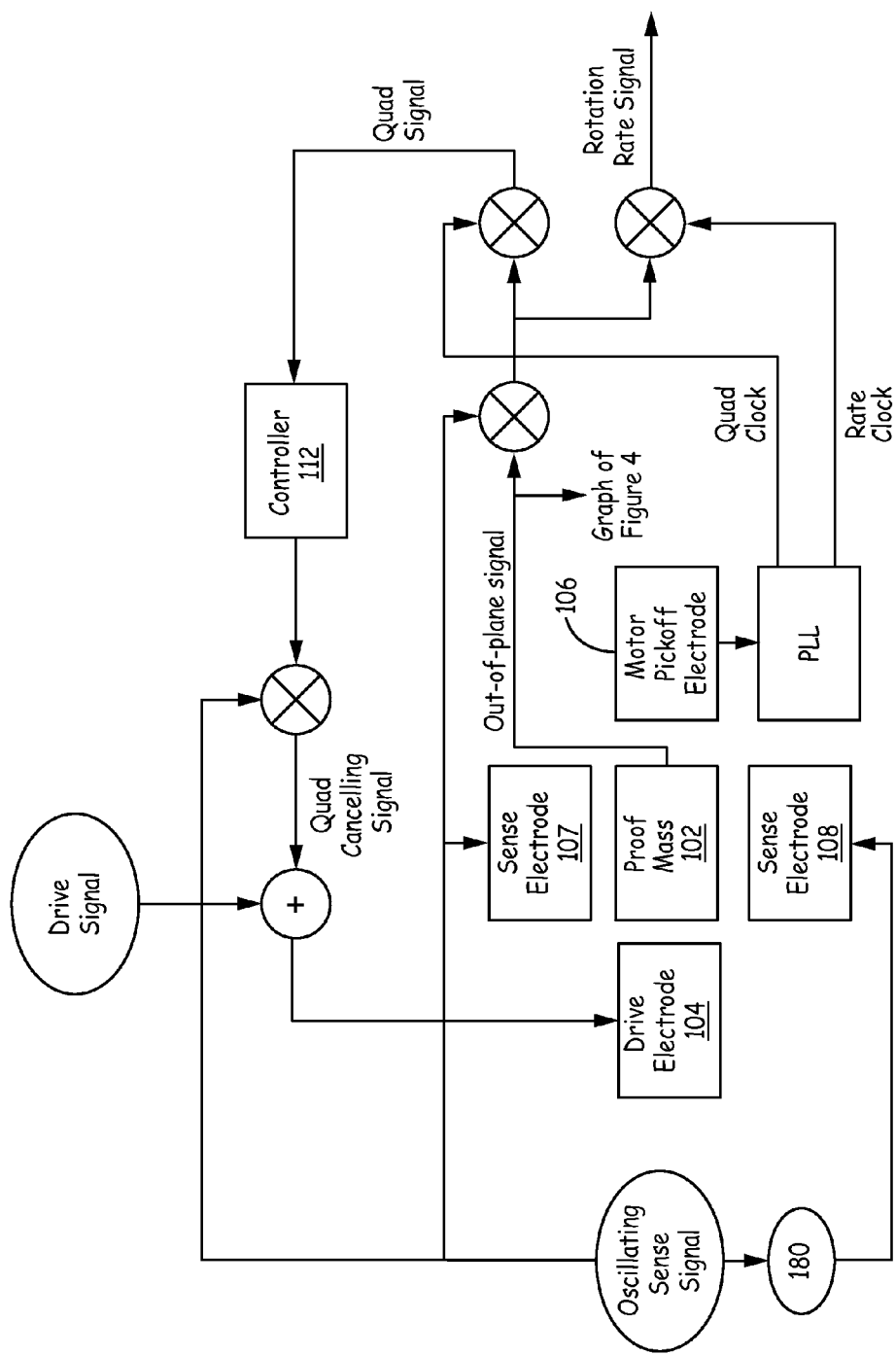
FIG. 3 is a block diagram of a portion of the gyroscope of FIGS. 1A and 1B.
Figure 4:
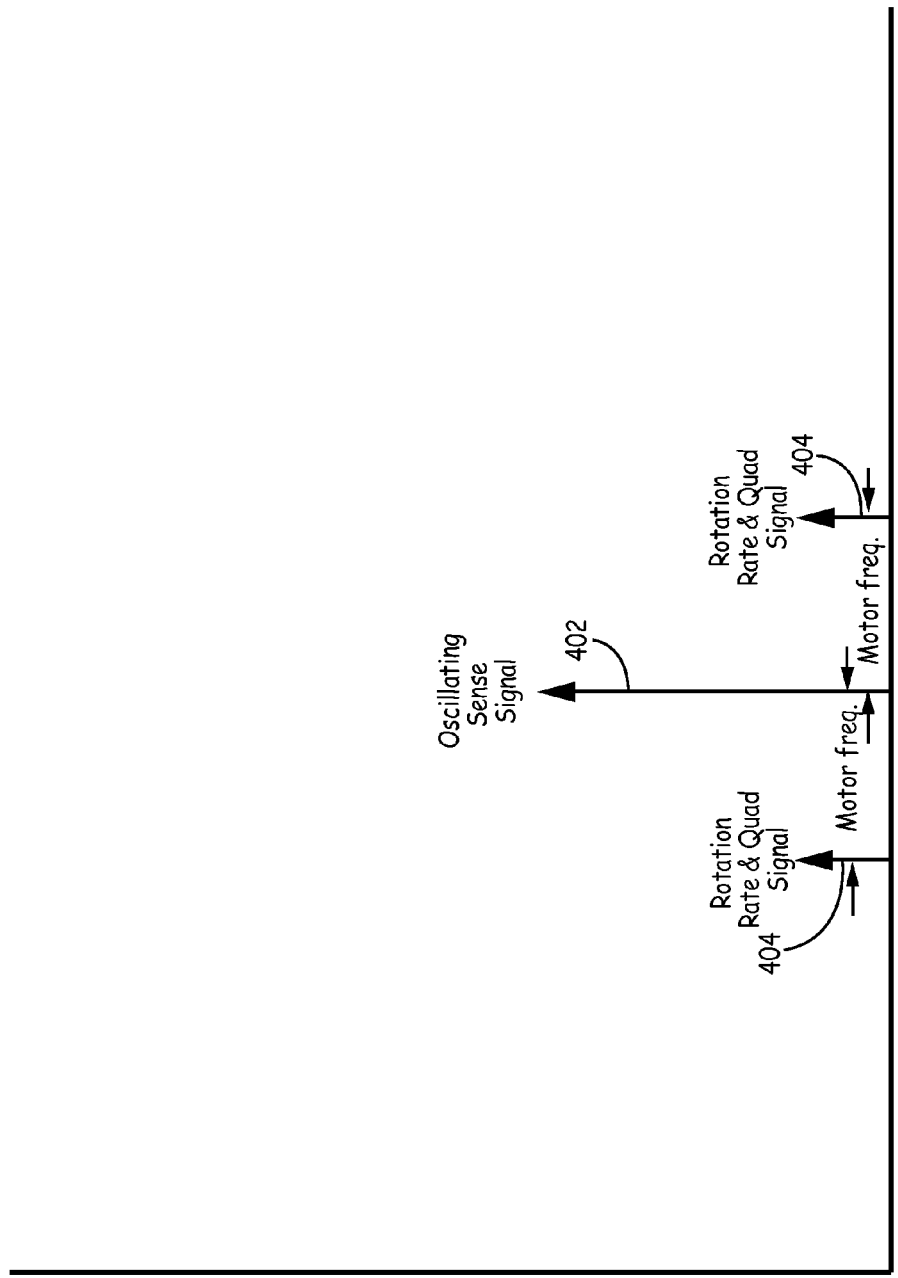
FIG. 4 is a graph of the frequency components of an example output signal from a proof mass in the gyroscope of FIGS. 1A, 1B, and 3.

The operation of the gyroscope 100 is described with respect to FIGS. 2, 3, and 4. FIG. 2 is a flow chart illustrating an example method 200 of operation of the gyroscope 100. FIG. 3 is a block diagram illustrating the input and output signals for one of the proof masses 102 of the gyroscope 100. FIG. 4 is a graph illustrating an example output signal from a proof mass 102, 103 of the gyroscope 100.

In operation, respective AC drive signals are applied to the drive electrodes 104, 105 to induce in-plane motion on the respective proof masses 102, 103 (block 202). The in-plane motion of the respective proof masses 102, 103 induces an in-plane signal (motor pickoff signal) on the in-plane motor pickoff electrode 106. The control electronics 112 are coupled to the motor pickoff electrode 106 and configured to process the in-plane signal to adjust the AC drive signals to maintain a desired magnitude and frequency (motor frequency) for the in-plane motion of the proof masses 102, 103. In an example, the drive signal has a frequency of half the motor frequency, such as a drive signal having a frequency of 5 kHz with a motor frequency of 10 kHz.

Respective voltages are applied between the sense electrodes 107-110 and their corresponding proof masses 102, 103 in order to sense out-of-plane motion of the proof masses 102, 103 (blocks 204, 206). For example, at a given moment in time a positive delta-v volts can be applied between the first proof mass 102 and the first sense electrode 107 proximate a first surface 114 of the first proof mass 102 (block 204) and a negative delta-v volts can be applied between the first proof mass 102 and the second sense electrode 108 proximate a second surface 115 of the first proof mass 102 (block 206). At this moment in time, there is a 2 times delta-v volt difference between the first and second sense electrode 107, 108. The voltage difference between the first and second sense electrode 107, 108 and the first proof mass 102 induces an out-of-plane signal on the first proof mass 102 when the first proof mass 102 moves out-of-plane (i.e., towards and away from the first and second sense electrodes 107, 108). The control electronics 112 are coupled to the first proof mass 102 and configured to process the out-of-plane signal to determine a rotation rate for the proof mass 102 among other things. Voltage differences are also applied between the third and fourth sense electrodes 109, 110 and the second proof mass 103 to induce out-of-plane motion on the second proof mass 103 in a similar manner. In the example shown in FIG. 1A, the proof masses 102, 103 are electrically coupled via the mechanical flexure 111. In such examples, a single out-of-plane signal is generated by the motion of both proof masses 102, 103. In examples where two or more proof masses 102, 103 are electrically isolated from one another; multiple out-of-plane signals are generated and are blended together in the control electronics 112. In such examples, the blended out-of-plane signals can be processed in the same manner as described herein for the single out-of-plane signal.

In an example, the voltages on the third and fourth sense electrodes 109, 110 are opposite that of the voltages on the first and second sense electrodes 107, 108. That is, the voltage applied to the sense electrode on a given side of its proof mass 102 is opposite the sense electrode on that side of the other proof mass 103. When the voltage difference applied between the first sense electrode 107 and the first proof mass 102 is positive delta-v, the voltage difference applied between the third sense electrode 109 and the second proof mass 103 is negative delta-v, wherein the first sense electrode 107 is proximate the first surface 114 of the first proof mass 102 and the third sense electrode 109 is proximate the first surface 116 of the second proof mass 103, and wherein the first surface 114 of the first proof mass 102 and the first surface 116 of the second proof mass 103 face the same direction. Similarly, if when the voltage difference applied between the second sense electrode 108 and the first proof mass 102 is negative delta-v, the voltage difference applied between the fourth sense electrode 110 and the second proof mass 103 is positive delta-v, wherein the second sense electrode 108 is proximate the second surface 115 of the first proof mass 102 and the fourth sense electrode 110 is proximate the second surface 117 of the second proof mass 103, and wherein the second surface 115 of the first proof mass 102 and the second surface 117 of the second proof mass 103 face the same direction.

As mentioned above, the voltage difference between the sense electrodes 107-110 and their respective proof masses 102, 103 can cause bias errors in the out-of-plane signal. To reduce these bias errors, the voltage applied between the sense electrodes 107-110 and their respective proof mass 102, 103 is oscillated between positive delta-v and negative delta-v. For example, a first oscillating sense signal applied to the first sense electrode 107 can oscillate between applying positive delta-v volts and negative delta-v volts to the first sense electrode 107. Similarly, a second oscillating sense signal applied to the second sense electrode 108 can oscillate between applying negative delta-v volts and positive delta-v volts to the second sense electrode 108. The first oscillating sense signal and the second oscillating sense signal can be 180 degrees out-of-phase such that when positive delta-v volts is applied to the first sense electrode 107, negative delta-v volts is applied to the second sense electrode 108 and when negative delta-v volts is applied to the first sense electrode 107, positive delta-v volts is applied to the second sense electrode 108. Thus, the voltage difference applied between the sense electrodes 107, 108 and the first proof mass 102 can be maintained while the sign of that voltage difference is alternated on each sense electrode 107, 108. This can help reduce bias errors caused by the voltage difference between the sense electrodes 107, 108 and the first proof mass 102 by effectively averaging out effects on the proof masses 102, 103 caused by the voltage differences of the sense electrodes 107-110.

The voltage difference applied to the third and fourth sense electrodes 109, 110 can be oscillated in synchronization with the oscillation of the first and second sense electrodes 107, 108. In particular, in order to maintain the opposite charges on the third and fourth electrode 109, 110 as compared to the first and second electrode 107, 108, the oscillation sense signal applied to the third sense electrode 109 can be 180 degrees out-of-phase with the first oscillating sense signal applied to the first sense electrode 107. Thus, the second oscillating sense signal, which is applied to the second sense electrode 108, can be applied to the third sense electrode 109. Likewise, the first oscillating sense signal can be applied to the fourth sense electrode 110 such that the voltage is 180 degrees out-of-phase with the voltage on the third sense electrode 109.

In an example, the first and second oscillating sense signals comprise square waves such that the voltage on a given sense electrode 107-110 is held at positive delta-v volts for a time period of a quarter period and is then switched to negative delta-v volts for a time period of another quarter period. The square wave causes the voltage on the sense electrode 107-110 to alternate in this manner between positive delta-v and negative delta-v volts. In another example, the first and second oscillating sense signals comprise sine waves (i.e., AC signals), such that the voltage on a given sense electrode 107-110 is incrementally varied between positive delta-v and negative delta-v volts according to the sine wave.

The value for delta-v is commonly referred to as the scale factor for the gyroscope 100. As such, delta-v can be set and/or adjusted over time as desired to implement the desired scale factor for the gyroscope 100. In an example, delta-v is in the range of 1 to 10 volts, and in a particular example is about 5 volts.

In an example, the frequency of the first and second oscillating sense signals can be a frequency of up to 100 kHz, and in a particular example is a frequency of about 50 kHz. Ideally, the frequency of the first and second oscillating sense signals is selected to be sufficiently spaced from the motor frequency (for example, 10 kHz) of the proof masses 102, 103, such that the oscillation of the voltage on the first and second sense electrodes 107, 108 does not induce motion on the proof masses 102, 103. Moreover, the frequency of oscillation is selected to be high enough that sufficient charge is unlikely to accumulate while a voltage on a sense electrode 107-110 is at a given sign. This is particularly so in examples where a square wave is used, as in such examples the voltage is held at large voltage differentials for a longer period of time. A high frequency can also be advantageous in examples where a sine wave is used.

Referring now to FIG. 3, a block diagram of a portion of the gyroscope 100 illustrating, among other things, a quad cancelling signal applied to one of the proof masses 102 is shown. In addition to the AC drive signals applied to the drive electrodes 104, 105, a quad cancelling signal can be applied to reduce quadrature motion caused by mechanical asymmetry in the gyroscope 100 (block 208). The quad cancelling signal can be applied to an in-plane electrode (in-plane with the proof masses 102, 103) for each proof mass 102, 103 respectively. In an example the in-plane electrode for the respective proof mass 102, 103 is the drive electrode 104, 105, such that the sum of a quad cancelling signal and an AC drive signal is applied to each drive electrode 104, 105. In other examples in-plane electrodes separate from the drive electrode 104, 105 can be used.

Since quadrature motion is out-of-plane motion, quadrature motion is observable in the out-of-plane signal from the proof mass(es) 102. Quadrature motion can be distinguished from out-of-plane motion due to rotation, because the two motions produce signals that are 90 degrees out-of-phase. Different phase demodulation can be used to distinguish between the quad signal and the rate signal. In particular, the out-of-plane signal is demodulated by a rate clock (signal) that is in sync (in phase) with the motor motion at the motor frequency to generate a rate signal (block 212), and the out-of-plane signal is demodulated by a quad clock (signal) that is 90 degrees out of the phase with the motor motion (block 212). In this way, a quad signal corresponding to the quad motion of the proof mass(es) 102 and a rate signal corresponding to the motion due to rotation of the proof mass(es) 102 can be generated. In addition to demodulation by the rate or quad clock, the out-of-plane signal is also demodulated by the oscillating sense signal to remove the effects of such oscillating sense signal on the out-of-plane signal (block 210).

FIG. 4 is a graph of the frequency components of an example of the out-of-plane signal. As shown, the out-of-plane signal primarily has three frequency components, a first component 402 from the oscillating sense signal, and two sidebands 404 therefrom comprising the rate and quad signal. The first component 402 is at the frequency of the oscillating sense signal, and can be quite large. This first component 402 can be reduced/removed by the demodulation of the out-of-plane signal with the oscillating sense signal (block 210). The sideband components 404 are spaced from the first component 402 on each side by a frequency equal to the motor frequency. Typically, without any quad cancellation, the quad signal is significantly larger than the rate signal in these sideband components 404. Due to the significantly larger quad signal, demodulation of the out-of-plane signal with the rate clock may not be sufficient to remove enough quad signal component from the sidebands 404 to generate an accurate rate signal.

To reduce the quad signal component of these sideband components 404, the quad signal is fed back through the control electronics 112 to generate the quad cancelling signal mentioned above (block 208). In particular, the control electronics 112 generate a bias voltage based on the magnitude of the quad signal. This bias voltage adjusts the magnitude of the quad cancelling signal to reduce (e.g., minimize) quadrature motion observable in the out-of-plane signal.

The quadrature motion is caused by the mechanical asymmetry in combination with the voltage differential applied by the sense electrodes 107-110. In order to apply to the proper quad cancelling signal to the in-plane electrode (e.g., drive electrodes 104, 105) when the voltage on the sense electrodes 107-110 is oscillating, the quad cancelling signal oscillates in sync with the oscillation of the oscillating sense signals. The quad cancelling signal can oscillate in sync with either the first or second oscillating sense signals depending on the direction of the desired bias to be applied. To accomplish this, the bias voltage is mixed with the oscillating sense signal to control how much of the oscillating sense signal is applied to the in-plane electrode(s).

The resulting quad cancelling signal is applied to the in-plane electrode (e.g., the drive electrodes 104, 105) to reduce the quad motion of the proof mass(es) 102, 103 and therefore to reduce the quad signal in the out-of-plane signal (block 208). In an example, the quad cancelling signal is summed with the drive signal and the sum of both signals is applied to the drive electrode 104.

Although FIG. 3 illustrates only a single proof mass 102 and a single in-plane electrode (drive electrode 104), it should be understood that a corresponding quad cancellation signal is applied to the other proof mass 103 in examples including such other proof mass 103. In such examples, since the third and fourth sense electrodes 109, 110 are opposite the first and second electrodes 107, 108, a first quad cancelling signal applied to a first in-plane electrode (e.g., first drive electrode 104) for the first proof mass 102 is 180 degrees out-of-phase with a second quad cancelling signal applied to a second in-plane electrode (e.g., second drive electrode 105) for the second proof mass 103. Moreover, the quad cancelling signals have the same form as the oscillating sense signals, such that in examples where the oscillating sense signals are square waves, the quad cancelling signals are also square waves, and in examples where the oscillating sense signals are sine waves, the quad cancelling signals are also sine waves. In some examples, the proof masses 102, 103 may have a sufficiently symmetric construction such that significant quad motion is not generated and a quad cancelling signal is not needed.

Since the voltage difference on the proof masses 102, 103 oscillates according to the oscillating sense signals, any out-of-plane motion of the proof masses 102, 103 will induce an correspondingly oscillating out-of-plane signal. In order to determine a rotation rate from such an out-of-plane signal, the control electronics 112 are configured to synchronously demodulate the out-of-plane signal at the motor frequency (rate clock) to generate a rate signal as mentioned above (block 214).

The control electronics 112 can include any suitable hardware and/or software for implementing the above described functions including a combination of analog and digital components. In an example, demodulation of the out-of-plane signal is accomplished with one or more suitable processing devices such as a general purpose or special purpose processor. Instructions to implement the above functions can be stored one or in an appropriate storage medium (e.g., flash memory or other non-volatile memory) from which the instructions can be read by the one or more processing devices. In an example, the frequency for the oscillating sense signals is selected to be low enough to enable demodulation of the out-of-plane signal by a suitable processing device. The gyroscope 100 can be configured to output a signal indicative of a rotation rate thereof.

Although the above examples describe a gyroscope with a pair of proof masses 102, 103 it should be understood that, in alternative examples, one or more than two proof masses may be used.

Example Embodiments

Example 1 includes a method for operating a micro-electro-mechanical system (MEMS) tuning fork gyroscope, the method comprising: oscillating a voltage on a first sense electrode out-of-plane from and proximate a first side of a first proof mass between a first voltage and a second voltage at a first frequency; oscillating a voltage on a second sense electrode out-of-plane from and proximate a second side of the first proof mass between the first voltage and the second voltage at the first frequency and 180 degrees out-of-phase with the voltage on the first sense electrode; and generating a rate signal corresponding to a rotation rate of the first proof mass by first demodulating an out-of-plane signal from the first proof mass at the first frequency and second demodulating the out-of-plane signal in phase with in-plane motion of the first proof mass.

Example 2 includes the method of Example 1, wherein oscillating a voltage on the first sense electrode and oscillating a voltage on the second sense electrode comprises oscillating the voltage on the first sense electrode and oscillating the voltage on the second sense electrode according to square waves such that the voltage on the first sense electrode and the second sense electrode alternates between the first voltage and the second voltage.

Example 3 includes the method of Example 1, wherein oscillating a voltage on the first sense electrode and oscillating a voltage on the second sense electrode comprises oscillating the voltage on the first sense electrode and oscillating the voltage on the second sense electrode according to sine waves.

Example 4 includes the method of any of Examples 1-3, wherein the first voltage is delta-v volts above a DC voltage level of the first proof mass and the second voltage is delta-v volts below the DC voltage level of the first proof mass.

Example 5 includes the method of Example 4, wherein delta-v volts is in the range of 1-10 volts.

Example 6 includes the method of any of Examples 1-5, comprising applying a first AC drive signal to a first in-plane electrode that is in-plane with the first proof mass in order to induce in-plane drive motion on the first proof mass; applying a first quad cancelling signal to the first in-plane electrode, the first quad cancelling signal having the first frequency and in-phase with either the voltage on the first sense electrode or the voltage on the second sense electrode.

Example 7 includes the method of Example 6, comprising: oscillating a voltage on a third sense electrode out-of-plane from and proximate a first side of a second proof mass between the first voltage and the second voltage at the first frequency and 180 degrees out-of phase with the voltage on the first sense electrode, wherein the second proof mass is in-plane with the first proof mass and the first side of the second proof mass faces the same direction as the first side of the first proof mass; oscillating a voltage on a fourth sense electrode out-of-plane from and proximate a second side of the second proof mass between the first voltage and the second voltage at the first frequency and 180 degrees out-of-phase with the voltage on the third sense electrode; wherein the first proof mass and the second proof mass are electrically coupled together; applying a second AC drive signal to a second in-plane electrode that is in-plane with the second proof mass in order to induce in-plane drive motion on the second proof mass; and applying a second quad cancelling signal to the second in-plane electrode, the second quad cancelling signal having the first frequency and being 180 degrees out-of-phase with the first quad cancelling signal.

Example 8 includes the method of any of Examples 6 or 7, comprising: generating a quad signal by first demodulating the out-of-plane signal from the first proof mass at the first frequency and second demodulating the out-of-plane signal at a 90 degree out-of-phase from the in-plane motion of the first proof mass; determining a motor bias value based on the magnitude of the quad signal; and mixing the motor bias value with a signal having the first frequency and in-phase with either the voltage on the first sense electrode or the voltage on the second sense electrode to generate the first quad cancelling signal.

Example 9 includes the method of any of Examples 1-8, wherein the first frequency is in the range of 1 Hz to 100 KHz.

Example 10 includes a micro-electro-mechanical system (MEMS) tuning fork gyroscope comprising: a first planar proof mass defining a first surface and a second surface; a first sense electrode out-of-plane from the first proof mass and proximate the first surface; a second sense electrode out-of-plane from the first proof mass and proximate the second surface; a first in-plane electrode having a comb that interleaves with a comb on the second planar proof mass; and control electronics configured to: apply a first AC drive signal to the first in-plane electrode to induce in-plane drive motion on the first proof mass; apply a first oscillating voltage to the first sense electrode and a second oscillating voltage to the second sense electrode, wherein the first oscillating voltage oscillates between a first voltage and a second voltage at a first frequency, and wherein the second oscillating voltage oscillates between the first voltage and the second voltage at the first frequency and 180 degrees out-of-phase from the first oscillating voltage; and determine a signal corresponding to a rotation rate of the first proof mass by first demodulating an out-of-plane signal from the first proof mass at the first frequency and second demodulating the out-of-plane signal in phase with in-plane motion of the first proof mass.

Example 11 includes the MEMS tuning fork gyroscope of Example 10, wherein the first oscillating voltage and the second oscillating voltage oscillate according to square waves such that the voltage on the first sense electrode and the second sense electrode alternates between the first voltage and the second voltage.

Example 12 includes the MEMS tuning fork gyroscope of Example 10, wherein the first oscillating voltage and the second oscillating voltage oscillate according to sine waves.

Example 13 includes the MEMS tuning fork gyroscope of any of Examples 10-12, wherein the first voltage is delta-v volts above a DC voltage level of the first proof mass and the second voltage is delta-v volts below the DC voltage level of the first proof mass.

Example 14 includes the MEMS tuning fork gyroscope of Example 13, wherein delta-v volts is in the range of 1-10 volts.

Example 15 includes the MEMS tuning fork gyroscope of any of Examples 10-14, wherein the control electronics are configured to apply a first quad cancelling signal to the first in-plane electrode, the first quad cancelling signal having the first frequency and in-phase with either the voltage on the first sense electrode or the voltage on the second sense electrode.

Example 16 includes the MEMS tuning fork gyroscope of Example 15, comprising: a second planar proof mass in-plane with and electrically coupled to the first proof mass and defining a third surface and a fourth surface, wherein the third surface faces the same direction as the first surface; a third sense electrode out-of-plane from the second proof mass and proximate the third surface; a fourth sense electrode out-of-plane from the second proof mass and proximate the fourth surface; and a second in-plane electrode having a comb that interleaves with a comb of the second planar proof mass; wherein the control electronics are configured to: apply a second AC drive signal to the second in-plane electrode to induce in-plane drive motion on the first proof mass; apply a third oscillating voltage to the third sense electrode and a fourth oscillating voltage to the fourth sense electrode, wherein the third oscillating voltage oscillates between the first voltage and the second voltage at the first frequency and 180 out-of-phase from the first oscillating voltage; and apply a second quad cancelling signal to the second in-plane electrode, the second quad cancelling signal having the first frequency and 180 degrees out-of-phase with the first quad cancelling signal.

Example 17 includes the MEMS tuning fork gyroscope of any of Examples 15 or 16, wherein the control electronics are configured to: generate a quad signal by first demodulating the out-of-plane signal from the first proof mass at the first frequency and second demodulating the out-of-plane signal at a 90 degree out-of-phase from the in-plane motion of the first proof mass; determine a motor bias value based on the magnitude of the quad signal; and mix the motor bias value with a signal having the first frequency and in-phase with either the voltage on the first sense electrode or the voltage on the second sense electrode to generate the first quad cancelling signal.

Example 18 includes the MEMS tuning fork gyroscope of any of Examples 10-17, wherein the first frequency is in the range of 1 Hz to 100 KHz.

Example 19 includes a micro-electro-mechanical system (MEMS) tuning fork gyroscope comprising: a first planar proof mass defining a first surface and a second surface; a first sense electrode out-of-plane from the first proof mass and proximate the first surface; a second sense electrode out-of-plane from the first proof mass and proximate the second surface; a first in-plane electrode having a comb that interleaves with a comb on the second planar proof mass; a second planar proof mass in-plane with the first proof mass and defining a third surface and a fourth surface, wherein the third surface faces the same direction as the first surface; a third sense electrode out-of-plane from the second proof mass and proximate the third surface; a fourth sense electrode out-of-plane from the second proof mass and proximate the fourth surface; a second in-plane electrode having a comb that interleaves with a comb of the second planar proof mass; and control electronics configured to: apply a first AC drive signal to the first in-plane electrode to induce in-plane drive motion on the first proof mass; apply a second AC drive signal to the second in-plane electrode to induce in-plane drive motion on the first proof mass; apply a first oscillating voltage to the first sense electrode and a second oscillating voltage to the second sense electrode, wherein the first oscillating voltage oscillates between a first voltage and a second voltage at a first frequency, and wherein the second oscillating voltage oscillates between the first voltage and the second voltage at the first frequency and 180 degrees out-of-phase from the first oscillating voltage; apply the first oscillating voltage to the fourth sense electrode and the second oscillating voltage to the third sense electrode; and determine a signal corresponding to a rotation rate of the first and second proof masses by first demodulating an out-of-plane signal from the first and second proof masses at the first frequency and second demodulating the out-of-plane signal in phase with in-plane motion of the first and second proof mass.

Example 20 includes the MEMS tuning fork gyroscope of Example 19, wherein the control electronics are configured to: apply a first quad cancelling signal to the first in-plane electrode, the first quad cancelling signal having the first frequency and in-phase with either the first oscillating voltage or the second oscillating voltage; and apply a second quad cancelling signal to the second in-plane electrode, the second quad cancelling signal having the first frequency and 180 degrees out-of-phase with the first quad cancelling signal.

What is claimed is:

1. A method for operating a micro-electro-mechanical system (MEMS) tuning fork gyroscope, the method comprising:
applying a first AC drive signal to a first in-plane electrode that is in-plane with a first proof mass in order to induce in-plane motion on the first proof mass;
oscillating a first voltage on a first sense electrode out-of-plane from and proximate a first side of the first proof mass between a first voltage value and a second voltage value at a first frequency, wherein the first voltage value is different from the second voltage value;
oscillating a second voltage on a second sense electrode out-of-plane from and proximate a second side of the first proof mass between the first voltage value and the second voltage value at the first frequency and 180 degrees out-of-phase with the first voltage on the first sense electrode; and
generating a rate signal corresponding to a rotation rate of the first proof mass by first demodulating an out-of-plane signal from the first proof mass at the first frequency and second demodulating the out-of-plane signal in phase with in-plane motion of the first proof mass.

2. The method of claim 1, wherein oscillating the first voltage on the first sense electrode and oscillating the second voltage on the second sense electrode comprises oscillating the first voltage on the first sense electrode and oscillating the second voltage on the second sense electrode according to square waves such that the first voltage on the first sense electrode and the second voltage on the second sense electrode alternate between the first voltage value and the second voltage value.

3. The method of claim 1, wherein oscillating the first voltage on the first sense electrode and oscillating the second voltage on the second sense electrode comprises oscillating the first voltage on the first sense electrode and oscillating the second voltage on the second sense electrode according to sine waves.

4. The method of claim 1, wherein the first voltage value is delta-v volts above a DC voltage level of the first proof mass and the second voltage value is delta-v volts below the DC voltage level of the first proof mass.

5. The method of claim 4, wherein delta-v volts is in the range of 1-10 volts.

6. The method of claim 1, comprising
applying a first quad cancelling signal to the first in-plane electrode, the first quad cancelling signal having the first frequency and in-phase with either the first voltage on the first sense electrode or the second voltage on the second sense electrode.

7. The method of claim 6, comprising:
oscillating a third voltage on a third sense electrode out-of-plane from and proximate a first side of a second proof mass between the first voltage value and the second voltage value at the first frequency and 180 degrees out-of-phase with the first voltage on the first sense electrode, wherein the second proof mass is in-plane with the first proof mass and the first side of the second proof mass faces the same direction as the first side of the first proof mass;
oscillating a fourth voltage on a fourth sense electrode out-of-plane from and proximate a second side of the second proof mass between the first voltage and the second voltage at the first frequency and 180 degrees out-of-phase with the third voltage on the third sense electrode;

wherein the first proof mass and the second proof mass are electrically coupled together;

applying a second AC drive signal to a second in-plane electrode that is in-plane with the second proof mass in order to induce in-plane drive motion on the second proof mass; and applying a second quad cancelling signal to the second in-plane electrode, the second quad cancelling signal having the first frequency and being 180 degrees out-of-phase with the first quad cancelling signal.

8. The method of claim 6, comprising:

generating a quad signal by first demodulating the out-of-plane signal from the first proof mass at the first frequency and second demodulating the out-of-plane signal at 90 degrees out-of-phase from the in-plane motion of the first proof mass;

determining a motor bias value based on the magnitude of the quad signal; and mixing the motor bias value with a signal having the first frequency and in-phase with either the first voltage on the first sense electrode or the second voltage on the second sense electrode to generate the first quad cancelling signal.

9. The method of claim 1, wherein the first frequency is in the range of 1 Hz to 100 KHz.

10. A micro-electro-mechanical system (MEMS) tuning fork gyroscope comprising:

a first planar proof mass defining a first surface and a second surface;

a first sense electrode out-of-plane from the first proof mass and proximate the first surface;

a second sense electrode out-of-plane from the first proof mass and proximate the second surface;

a first in-plane electrode having a comb that interleaves with a comb on the first planar proof mass; and control electronics configured to:

apply a first AC drive signal to the first in-plane electrode to induce in-plane drive motion on the first proof mass;

apply a first oscillating voltage to the first sense electrode and a second oscillating voltage to the second sense electrode, wherein the first oscillating voltage oscillates between a first voltage value and a second voltage value at a first frequency, and wherein the second oscillating voltage oscillates between the first voltage value and the second voltage value at the first frequency and 180 degrees out-of-phase from the first oscillating voltage, wherein the first voltage value is different from the second voltage value; and determine a signal corresponding to a rotation rate of the first proof mass by first demodulating an out-of-plane signal from the first proof mass at the first frequency and second demodulating the out-of-plane signal in phase with in-plane drive motion of the first proof mass.

11. The MEMS tuning fork gyroscope of claim 10, wherein the first oscillating voltage and the second oscillating voltage oscillate according to square waves such that the first oscillating voltage on the first sense electrode and the second oscillating voltage on the second sense electrode alternate between the first voltage value and the second voltage value.

12. The MEMS tuning fork gyroscope of claim 10, wherein the first oscillating voltage and the second oscillating voltage oscillate according to sine waves.

13. The MEMS tuning fork gyroscope of claim 10, wherein the first voltage value is delta-v volts above a DC voltage level of the first proof mass and the second voltage value is delta-v volts below the DC voltage level of the first proof mass.

14. The MEMS tuning fork gyroscope of claim 13, wherein delta-v volts is in the range of 1-10 volts.

15. The MEMS tuning fork gyroscope of claim 10, wherein the control electronics are configured to apply a first quad cancelling signal to the first in-plane electrode, the first quad cancelling signal having the first frequency and in-phase with either the first oscillating voltage on the first sense electrode or the second oscillating voltage on the second sense electrode.

16. The MEMS tuning fork gyroscope of claim 15, comprising:

a second planar proof mass in-plane with and electrically coupled to the first proof mass and defining a third surface and a fourth surface, wherein the third surface faces the same direction as the first surface;

a third sense electrode out-of-plane from the second proof mass and proximate the third surface;

a fourth sense electrode out-of-plane from the second proof mass and proximate the fourth surface; and a second in-plane electrode having a comb that interleaves with a comb of the second planar proof mass;

wherein the control electronics are configured to:

apply a second AC drive signal to the second in-plane electrode to induce in-plane drive motion on the second proof mass;

apply a third oscillating voltage to the third sense electrode and a fourth oscillating voltage to the fourth sense electrode, wherein the third oscillating voltage oscillates between the first voltage value and the second voltage value at the first frequency and 180 out-of-phase from the first oscillating voltage; and apply a second quad cancelling signal to the second in-plane electrode, the second quad cancelling signal having the first frequency and 180 degrees out-of-phase with the first quad cancelling signal.

17. The MEMS tuning fork gyroscope of claim 15, wherein the control electronics are configured to:

generate a quad signal by first demodulating the out-of-plane signal from the first proof mass at the first frequency and second demodulating the out-of-plane signal at 90 degrees out-of-phase from the in-plane motion of the first proof mass;

determine a motor bias value based on the magnitude of the quad signal; and mix the motor bias value with a signal having the first frequency and in-phase with either the first oscillating voltage on the first sense electrode or the second oscillating voltage on the second sense electrode to generate the first quad cancelling signal.

18. The MEMS tuning fork gyroscope of claim 10, wherein the first frequency is in the range of 1 Hz to 100 KHz.

19. A micro-electro-mechanical system (MEMS) tuning fork gyroscope comprising:

a first planar proof mass defining a first surface and a second surface;

a first sense electrode out-of-plane from the first proof mass and proximate the first surface;

a second sense electrode out-of-plane from the first proof mass and proximate the second surface;
a first in-plane electrode having a comb that interleaves with a comb on the first planar proof mass;
a second planar proof mass in-plane with the first proof mass and defining a third surface and a fourth surface, wherein the third surface faces the same direction as the first surface;
a third sense electrode out-of-plane from the second proof mass and proximate the third surface;
a fourth sense electrode out-of-plane from the second proof mass and proximate the fourth surface;
a second in-plane electrode having a comb that interleaves with a comb of the second planar proof mass; and
control electronics configured to:
apply a first AC drive signal to the first in-plane electrode to induce in-plane drive motion on the first proof mass;
apply a second AC drive signal to the second in-plane electrode to induce in-plane drive motion on the first proof mass;
apply a first oscillating voltage to the first sense electrode and a second oscillating voltage to the second sense electrode, wherein the first oscillating voltage oscillates between a first voltage value and a second voltage value at a first frequency, and wherein the second oscillating voltage oscillates between the first voltage value and the second voltage value at the first frequency and 180 degrees out-of-phase from the first oscillating voltage, wherein the first voltage value is different from the second voltage value;
apply the first oscillating voltage to the fourth sense electrode and the second oscillating voltage to the third sense electrode; and
determine a signal corresponding to a rotation rate of the first and second proof masses by first demodulating an out-of-plane signal from the first and second proof masses at the first frequency and second demodulating the out-of-plane signal in phase with in-plane drive motion of the first and second proof mass.

20. The MEMS tuning fork gyroscope of claim 19, wherein the control electronics are configured to:
apply a first quad cancelling signal to the first in-plane electrode, the first quad cancelling signal having the first frequency and in-phase with either the first oscillating voltage or the second oscillating voltage; and
apply a second quad cancelling signal to the second in-plane electrode, the second quad cancelling signal having the first frequency and 180 degrees out-of-phase with the first quad cancelling signal.

* * * * *